United States Patent Office 3,545,259
Patented Dec. 8, 1970

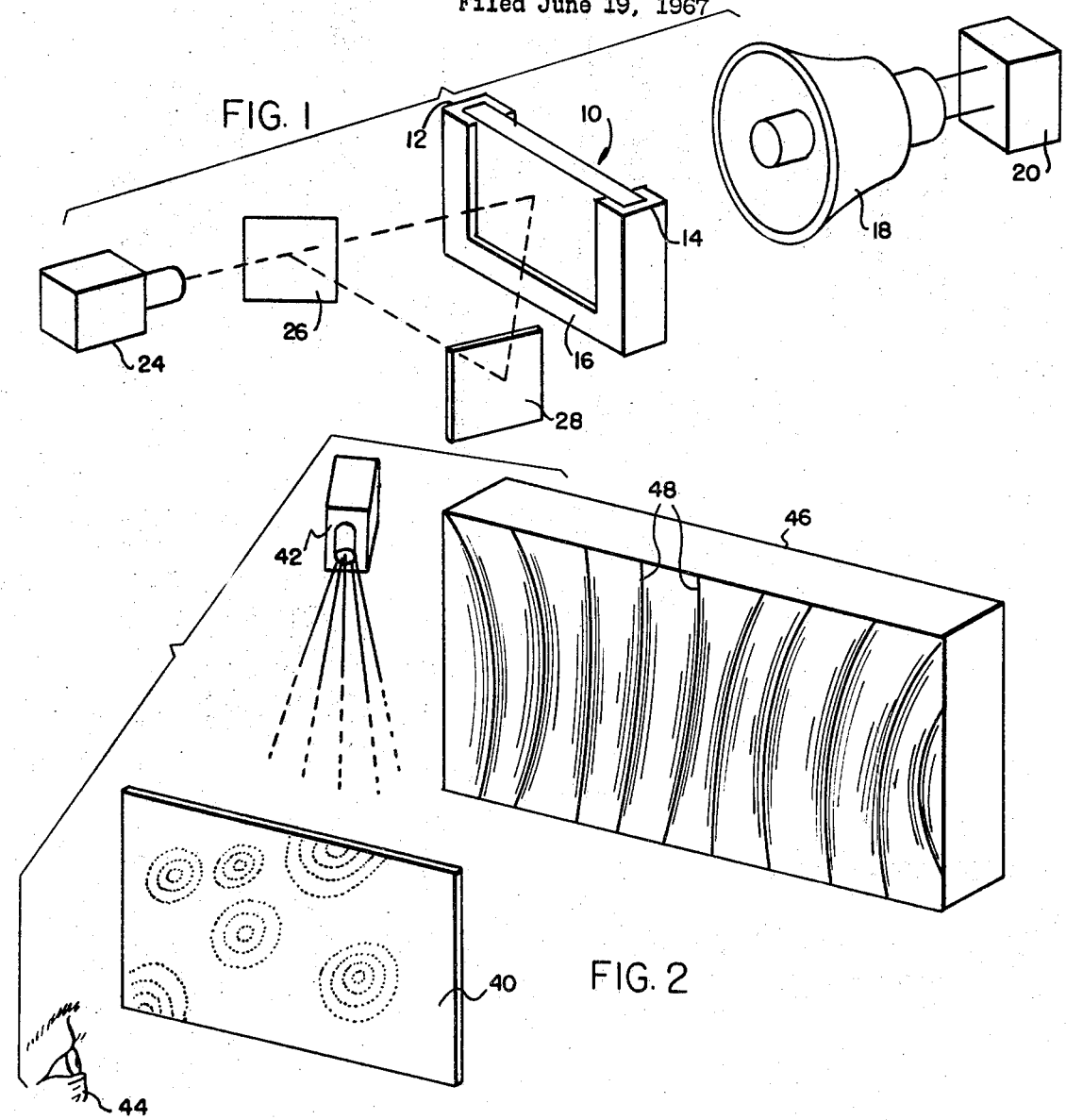

3,545,259
HOLOGRAPHIC METHOD OF DETERMINING PROPERTIES OF MATERIALS
Ralph Maynard Grant, Ann Arbor, Mich., assignor, by mesne assignments, to G.C. Optronics, Inc., Ann Arbor, Mich., a corporation of Delaware
Filed June 19, 1967, Ser. No. 647,102
Int. Cl. G01n 29/00
U.S. Cl. 73—69
9 Claims

ABSTRACT OF THE DISCLOSURE

A plurality of samples of a material having at least one property such as hardness, ductility, alloy and content, etc, differing from one another, are rigidly supported and caused to regularly vibrate. Holograms are made of each of them during vibration by known means which includes the photographic recordation of the interference pattern between light reflected from the member and light directly from a source, and developing the photographic plate. The optical reconstructions of the articles which may be observed by viewing through the resulting hologram will reveal fringe families which represent contours of equal amplitude of vibration resulting from the time averaging effect of the photographic plate. These fringe families will differ from one another on each member because of minute differences in vibration resulting from the members different properties. A similar member having unknown properties is then similarly supported and caused to vibrate and a hologram is made of it. The optical reconstruction of the unknown member is then viewed through the developed hologram and the fringe family exhibited is compared with the fringe families of the samples to determine the properties of the unknown members.

BACKGROUND OF THE INVENTION

Field of the invention

This invention relates to holography, and more particularly to the non-destructive testing of physical properties of members by causing them to vibrate, preparing the hologram of them while undergoing vibration, reconstructing the visual image of the member from the developed hologram to observe fringe lines constituting contours of the equal amplitude of vibration, and comparing such fringe lines to those generated by members having known properties.

Description of the prior art

It has previously been recognized that the pattern of motion of a member undergoing vibration and the amplitude of the motion at any point may be analyzed by holography. See Interferometric Vibration Analysis by Wave Front Construction, Powell & Stetson, Journal of the Optical Society of America, December 1965, p. 1593. This method involves the formation of a hologram of a member undergoing vibration by the photographic recording of the interference patterns between coherent light reflected from the object and light directly from the coherent source. Since the vibrational movement of any segment on the member is generally sinusoidal and the photographic emulsion is responsive to the integral of the light it receives, the hologram will effectively record two images of the member, one at each of the end points of its vibrational motion, assuming that this motion is small compared to the wave length of the light being used. Upon reconstruction, the light refracted from these two superimposed images will interfere and manifest itself as a family of fringe lines on the optical reconstruction of the object. Analysis has shown that these fringe lines represent contours of equal amplitude of vibratory motion of the member, thus revealing the pattern of vibration, and the amplitude of vibration may be deduced from the spacing of the fringes.

SUMMARY OF THE PRESENT INVENTION

We have determined that slight variations in the physical properties of members result in measurable differences in their vibration in response to an appropriate inducing source, such differences resulting in variations in the fringe lines observed on reconstruction of the images of the members from holograms formed of them while vibrating. We have additionally determined that the vibrations, and the fringe families produced in the analytic method, undergo a progressive modification as a particular property of the member is progressively varied. For example, assume a plurality of plates which are identical in physical configuration and metallurgical properties except that they have undergone various degrees of heat treatment. Since the heat treatment affect their hardness, each of them will vibrate in a slightly different manner. When holograms are formed of them during vibration, the resultant optical reconstructions will exhibit slightly differing fringe line patterns. These fringe line patterns are actually a measurement of the hardness of the member. The present invention therefore contemplates a non-destructive method of analyzing such properties as hardness, ductility, etc. which essentially consist of making a plurality of holograms of members having varying properties, while the members are rigidly supported at their edges and are undergoing vibration. After development of the holograms the reconstructed optical images of the members, including the varying fringe families, are photographed to provide a group of test samples. When an unknown member having the same physical configuration and properties as the test specimens, but varying in the test parameter, is to be measured, it is mounted on its edges and vibrations are induced in it and a hologram is made of it. The optical reconstruction of it from the hologram is then matched with those of the test members in order to determine the magnitude of its test property.

In addition to identically matching the unknown with the members of the test group it is possible to interpolate and extrapolate between and beyond the range of the test members to determine the properties of the unknown. The present analytic method is useful in connection with any members which have a physical configuration which allows relatively low amplitude vibrations to be induced in them. It may be employed to measure any physical properties such as thickness, or hardness, or the measure metallurgical properties which control the physical properties. Thus, the particular alloy of which an unknown consists might be determined by comparing it with a group of specimens made of alloys of various compositions, since the alloy composition will affect physical properties such as hardness of the member.

Other objects, advantages and applications of the present invention will be made apparent by the following detailed description of a preferred embodiment of the method. The description makes reference to the accompanying drawings in which:

FIG. 1 is a schematic view illustrating the manner of forming a holograph of a vibrating member, be it a test specimen, or an unknown;

FIG. 2 is a schematic diagram illustrating the optical reconstruction of the image of the object, including the fringe families representing contours of equal amplitudes of vibration; and FIG. 3 illustrates the comparison of the fringe families derived in the optical reconstruction of a vibrating unknown from a hologram, with a group of photographs of specimen fringe families.

Referring to the drawings, the arrangement for forming a hologram of a member, generally indicated at 10, while, it undergoes vibration, is illustrated in FIG. 1. The member 10 is shown to be a rectangular plate. It might either constitute a specimen undergoing test or one of a number of members of known properties which are to be used as samples. In order to cause the member to vibrate it is fixed at opposed edges by a pair of clamp members 12 and 14 supported above a base 16. Vibrations are then induced in it by means of a loudspeaker 18 driven by a variable frequency generator 20. The loudspeaker is disposed parallel to and separated from one face of the test specimen 10 so that the sonic vibrations generated by the loudspeaker are induced into the specimen.

The particular manner of supporting a specimen is dependent upon its configuration, but the same support apparatus must be used with the specimen under test and all the known members in order to ensure that exactly the same vibrational forces are urged on each of them.

A hologram is formed of the member while it is undergoing vibration through use of coherent light source, such as a laser 24, which projects light onto one surface of the specimen 10 through a half-silvered mirror 26. The mirror is positioned so as to reflect a portion of the beam onto a photographic plate 28 positioned to also receive light reflected from the illuminated surface of the member 10. The laser is of a continuous wave variety and a relatively long exposure time is utilized so that the photographic plate experiences light reflected from the test member during a number of vibrations. The photographic plate 28 will be subjected to light which represents an interference pattern between light reflected to it directly from the mirror 26 and that reflected from the test specimen. Since the test specimen vibrates in a generally sinusoidal mode, the major portion of the light reflected to it from the specimen will be reflected during those periods when the member is near its end points of vibration. The photographic plate integrates the light it receives and therefore effectively records any interference pattern between the direct coherent light and light reflected from the object during its two extreme positions of vibration.

Following the exposure the photographic plate 28 is suitably developed to provide a hologram. It should be understood that other methods of forming holograms, such as the white light methods known to the art wherein a hologram may be viewed with non-coherent light, may be employed.

FIG. 2 illustrates the manner in which the developed hologram 40 of FIG. 1 may be viewed. The coherent light source 42 illuminates one side of the hologram and an observer 44 viewing through the hologram may observe a reconstructed visual image 46 of the test specimen 10 as a result of the light from the laser 42 being refracted by the interference pattern recorded on the hologram. The reconstructed image 46 will be that of the specimen 10 with a plurality of fringe lines 48 superimposed thereon. The fringe lines 48 are darkest at their center and lighter outwardly from the center and may be analytically shown to represent contours of equal amplitudes of vibration of the member 10.

If the specimen 10 were a sample, a photograph of the reconstructed image would be made through the hologram revealing the fringe line 48 families. A plurality of such photographs would be prepared from samples which are identical to one another in all properties except the test parameter. For example, the specimens could all have the same physical configuration and alloy but represent varying degrees of hardness. The fringe families would differ from one specimen to another in a uniform manner.

In order to determine the property of a member having the same physical configuration and alloy as the test samples, the unknown would be supported in the clamp members 12 and 14 in the manner shown in FIG. 1, and the hologram would be formed while it is undergoing vibration. After development, the reconstructed image would be viewed, and this visible fringe families would be compared with photographs of the known samples. If the hardness of the unknown member is identical to one of the samples its fringe pattern should substantially coincide with that of the sample. If the fringe pattern of the unknown member is intermediate those of the test specimens or represents an extreme beyond them, the hardness of the unknown may be estimated by interpolation or extrapolation processes.

The comparison of the fringe families visible on the optical reconstruction of an unknown with those of test samples is illustrated in FIG. 3. Three test samples 50, 52 and 54 are shown which may constitute members of the same shape as 10 having respective hardnesses of 20, 40 and 60 on the Brinell "C" scale. The unknown member 56 exhibits a fringe family which is quite close to that of member 52, in the direction of 54. The hardness of this specimen may be estimated at approximately 45 on the Brinell "C" scale.

Other physical and metallurgical properties and dimensional variations can be tested by this same method.

Having thus described my invention, I claim:

1. The method of determining an unknown physical property of a test member which is identical in all respects other than the property to a group of samples having various magnitudes of the particular property, comprising: supporting the unknown and each of the test samples; exerting a physical force on the unknown and test specimens while they are supported, which force is sufficient to generate minute vibrations in such members; forming a hologram of each of the members while they are undergoing vibration at the same frequency; and comparing the fringe families visible in the optical reconstruction of the unknown with the fringe families present in the optical reconstructions of each of the samples on the basis that the fringe families vary as do the unknown property.

2. The method of claim 1, wherein the comparison of the fringe family visible in the optical reconstruction of the unknown with the fringe families visible in the optical reconstructions of the samples is performed by photographing the optical reconstructions of the samples and comparing them to the optical reconstruction of the unknown.

3. The method of claim 1, wherein the hologram is formed by exposing a photographic plate to light directly from a coherent source and to light reflected from the member while it is vibrating, for a period consisting of a number of vibrations, and developing the photographic plate.

4. The method of claim 1, wherein the force operative to induce vibrations in members are provided by an electro-mechanical transducer suitably coupled to the test specimen.

5. The method of claim 4, wherein the electro-mechanical transducer is coupled to the test specimen by air.

6. The method of claim 1, wherein the unknown property is hardness and each of the test samples are identical to one another in physical and metallurgical properties but have a different hardness, and the unknown is identical to the test samples in physical and metallurgical properties.

7. The method of claim 1, wherein the test samples and the unknown are supported by clamping them at their edges.

8. The method of claim 1, wherein the fringe families visible on the optical reconstructions of the samples are recorded for a comparison with the fringe families which occur on the optical reconstruction of the unknown.

9. The method of determining an unknown physical property of a test member which is identical in all respects other than the property to a group of samples having various magnitudes of the particular property, comprising: supporting the unknown and each of the test samples; inducing vibrations of the same frequency in the unknown and each of the test samples; forming holograms of each of the members while they are undergoing vibration; and comparing the fringe families visible in the optical reconstruction of the test member with the fringe families present in the optical reconstructions of each of the samples on the basis that the fringe families vary as do the unknown property.

References Cited

UNITED STATES PATENTS

| | | | |
|---|---|---|---|
| 2,782,632 | 2/1957 | Klein et al. | 73—67.2 |
| 3,226,975 | 1/1966 | Muller et al. | 73—67.2 |
| 2,848,775 | 8/1958 | Ettenreich | 22—200(73—67.2UX) |

FOREIGN PATENTS

| | | | |
|---|---|---|---|
| 1,011,472 | 12/1965 | Great Britain | 73—67.2 |

OTHER REFERENCES

Powell, R. L., et. al., "Interferometric Vibration Analysis by Wavefront Reconstruction," J. of Optical Society of Amer., vol. 55, December 1965 pp. 1593–1598.

Stetson, K. A., et al., "Interferometric Hologram Evaluation and Real-Time Vibration Analysis of Diffuse Objects," J. of Optical Society of Amer., vol. 55, December 1965, pp. 1694–1695.

RICHARD C. QUEISSER, Primary Examiner

J. P. BEAUCHAMP, Assistant Examiner

U.S. Cl. XR.

73—71.3, 78; 350—3.5